United States Patent
Chau

(10) Patent No.: US 9,536,123 B2
(45) Date of Patent: Jan. 3, 2017

(54) DATA APPLICATION METHOD AND SYSTEM OF RFID TAGS

(71) Applicant: Ching Ho Chau, Hong Kong (HK)

(72) Inventor: Ching Ho Chau, Hong Kong (HK)

(73) Assignee: SHENZHEN WALE INTELLIGENT SYSTEM LIMITED, Shenzhen (CN)

(*) Notice: Subject to any disclaimer, the term of this patent is extended or adjusted under 35 U.S.C. 154(b) by 0 days.

(21) Appl. No.: 15/051,682

(22) Filed: Feb. 24, 2016

(65) Prior Publication Data
US 2016/0275321 A1 Sep. 22, 2016

Related U.S. Application Data

(60) Provisional application No. 62/134,562, filed on Mar. 17, 2015.

(51) Int. Cl.
| | |
|---|---|
| H04Q 5/22 | (2006.01) |
| G06K 7/10 | (2006.01) |
| H04B 5/00 | (2006.01) |
| H04L 29/06 | (2006.01) |

(52) U.S. Cl.
CPC .......... G06K 7/10366 (2013.01); H04B 5/0062 (2013.01); H04L 69/08 (2013.01)

(58) Field of Classification Search
CPC ............ G06K 7/10366; G06K 7/10009; G06K 7/10316; H04W 12/06; H04W 4/16; H04W 12/08; H04W 4/008

USPC ......................... 340/10.1–10.6; 455/410–420
See application file for complete search history.

(56) References Cited

U.S. PATENT DOCUMENTS

| | | | |
|---|---|---|---|
| 8,880,055 B1 * | 11/2014 | Clement | G06Q 20/3278 455/410 |
| 2003/0158954 A1 * | 8/2003 | Williams | H04L 29/06 709/230 |
| 2006/0258289 A1 * | 11/2006 | Dua | G06F 17/30058 455/41.3 |
| 2009/0289764 A1 * | 11/2009 | Chiu | H04Q 9/00 340/10.1 |
| 2014/0229246 A1 * | 8/2014 | Ghaffari | G06K 19/0723 705/13 |

* cited by examiner

*Primary Examiner* — Kerri McNally
*Assistant Examiner* — Sharmin Akhter

(57) ABSTRACT

A data application method and system of radio-frequency identification (RFID) tags are provided. The method includes: when a first-type RFID tag is within a readable range of a first-type RFID reader, acquiring, by the first-type RFID reader, data of the first-type RFID tag; obtaining, by an RFID emulator, the data of the first-type RFID tag, converting the data of the first-type RFID tag to data of a second-type RFID tag according to a predetermined data conversion protocol, and providing the data of the second-type RFID tag for a second-type RFID reader; and forming, by the second-type RFID reader, a second-type RFID signal according to the data of the second-type RFID tag and sending the second-type RFID signal. The data application method and system expand applications of RFID tags.

14 Claims, 4 Drawing Sheets

DATA APPLICATION METHOD AND SYSTEM OF RFID TAGS

CROSS-REFERENCE TO RELATED APPLICATIONS

This application claims the benefit of U.S. Provisional Patent Application No. 62/134,562, filed Mar. 17, 2015, the entire content of which is hereby incorporated by reference.

BACKGROUND

Technical Field

The present application relates to data communications, and particularly, to a data application method and system of radio-frequency identification (RFID) tags.

Related Art

RFID is a technology to which attention has been relatively paid in recent years; especially on the occasion that the concept of Internet of Things (IoT) has been increasingly accepted by people and application fields thereof are more and more extensive, RFID plays an increasingly important role.

As shown in FIG. 1, an RFID system generally consists of a computer system 11, a reader 12, an antenna 13 and an electronic tag 14, and different types of RFID tags can work normally only by matching corresponding readers and antennas. This causes applications of the RFID technology in some occasions to be restricted, and further improvements are still needed to cause RFID applications to be more extensive.

SUMMARY

The present application provides a data application method of RFID tags, including:

when a first-type RFID tag is within a readable range of a first-type RFID reader, acquiring, by the first-type RFID reader, data of the first-type RFID tag;

obtaining, by an RFID emulator, the data of the first-type RFID tag, converting the data of the first-type RFID tag to data of a second-type RFID tag according to a predetermined data conversion protocol, and providing the data of the second-type RFID tag for a second-type RFID reader; and forming, by the second-type RFID reader, a second-type RFID signal according to the data of the second-type RFID tag and sending the second-type RFID signal.

In one embodiment, the first-type RFID reader, the second-type RFID reader and the RFID emulator may be integrated into a physical device.

In one embodiment, the physical device may acquire associated data of the data of the first-type RFID tag from a cloud server or a local database according to the data of the first-type RFID tag.

In one embodiment, the RFID emulator may integrate a codec system that achieves data conversion. The codec system may include a dedicated IC, or a digital signal processing (DSP) processor.

In one embodiment, the first-type RFID tag may be an Ultra High Frequency (UHF) tag, the first-type reader may be a UHF reader, the second-type RFID tag may be a quick response (QR) tag, the second-type reader may be a QR reader, and the second-type RFID signal may be a QR signal.

In one embodiment, the first-type RFID tag may be an Ultra High Frequency (UHF) tag, the first-type reader may be a UHF reader, the second-type RFID tag may be a Near Field Communication (NFC) tag, the second-type reader may be an NFC reader, and the second-type RFID signal may be an NFC signal.

In one embodiment, the NFC signal may be acquired from the NFC reader through a smart mobile terminal with an NFC function.

In one embodiment, an operating process of the data application method may include:

transmitting, by the UHF reader, radio waves through a UHF antenna, and when the UHF tag is within coverage of the radio waves, the UHF tag being activated;

obtaining, by the UHF reader, tag identification or an electronic product code sent by the activated UHF tag through the UHF antenna;

transmitting, by the UHF reader, the tag identification or electronic product code to the RFID emulator and judging whether the UHF tag is a desired product;

acquiring, by the RFID emulator, product information represented by the UHF tag from the local database or the cloud server;

converting, by the RFID emulator, the product information to an NFC code containing product related information according to a predetermined coding algorithm;

sending, by the RFID emulator, an NFC signal containing the NFC code through the NFC reader; and obtaining, by the smart mobile terminal of which the NFC function has been opened, the NFC signal within the readable range, and acquiring and displaying the product related information through an application mode or a hyperlink mode.

In one embodiment, the data application method may include: judging and deciding in which manner the product information is displayed, wherein when the product information is displayed in an APP manner, acquired data is generated in the application mode, and when the product information is displayed in a hyperlink manner, the acquired data is generated in the hyperlink mode.

The present application further provides a data application system of RFID tags, including:

a first-type RFID reader that, when a first-type RFID tag is within a readable range of the first-type RFID reader, acquires data of the first-type RFID tag;

an RFID emulator that obtains the data of the first-type RFID tag, converts the data of the first-type RFID tag to data of a second-type RFID tag according to a predetermined data conversion protocol, and provides the data of the second-type RFID tag for a second-type RFID reader; and the second-type RFID reader that forms a second-type RFID signal according to the data of the second-type RFID tag and sends the second-type RFID signal.

The data application method and system of the present application can expand applications of RFID tags, making the applications thereof more extensive.

BRIEF DESCRIPTION OF THE DRAWINGS

The present application is further described below with reference to the accompanying drawings and embodiments, wherein.

DETAILED DESCRIPTION

Figure 1:
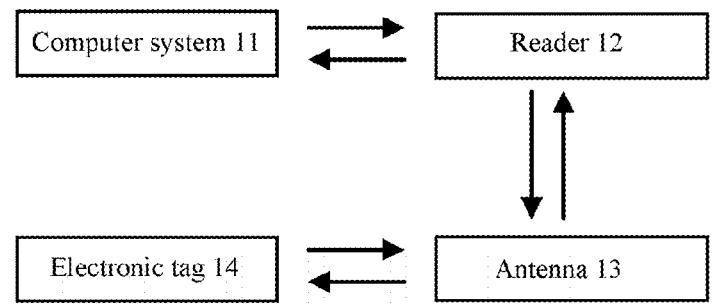
FIG. 1 is a system architecture diagram of an RFID application in the prior art.

The following detailed description with reference to the accompanying drawings is intended to serve as description of various embodiments of the present application, instead of being considered to represent a unique form that the present application can be constructed and/or used. The description describes functions and structures for constructing and operating the application related to illustrated embodiments. However, it should be understood that the same or equal functions may be completed by a different embodiment, and the embodiment is considered to be included in the spirit and scope of the application.

RFID generally includes four main types, LF, HF (NFC), UHF and MW; although they vary due to different working frequency bands and implementation modes, they all belong to a category of radio frequencies. As the following Table 1:

TABLE 1

| Type | Frequency | Read range | Application |
|---|---|---|---|
| Low Frequency LF | 100-500 kHz 125K/134K is common | generally 0-50 cm | access control, biological recognition, vehicle door lock and so on |
| High Frequency HF (NFC) | 13.56 MHz | 0-10 cm | access control, smart card, library and electronic document supervision, payment system and so on |
| Ultra High Frequency (UHF) | 860-960 MHz | generally 0-10 m | supply chain application, single grade track, check of goods and so on. (passive) |
| microwave MW | 2.45 GHz 5.8 GHz | generally 5-80 M up to 1.5 KM | object track, automatic fare collection system |

As different types of electronic tags have different characteristics, the tags are suitable for different scenarios and applications, for example, a UHF reading distance may generally be over 3 M, and thus it is suitable for use in the field of logistics; and as NFC is a near-field reading manner (<10 cm), it is suitable for use in aspects of electronic payment of terminal users and near-field data transmission.

Currently, an NFC module has often been installed in smart mobile terminals, for example, in various smartphones, so that the smart mobile terminals have an NFC function; however, as stated previously, due to diversification of types of RFID tags, the smart mobile terminals only equipped with an NFC module are still restrictive in the applications of RFID, but if various RFID tag supporting functions are all installed to the smart mobile terminals, both the cost and portability of the smart mobile terminals are adversely affected.

In an embodiment of the present application, a data application method of RFID tags is provided, including:

when a first-type RFID tag is within a readable range of a first-type RFID reader, acquiring, by the first-type RFID reader, data of the first-type RFID tag;

obtaining, by an RFID emulator, the data of the first-type RFID tag, converting the data of the first-type RFID tag to data of a second-type RFID tag according to a predetermined data conversion protocol, and providing the data of the second-type RFID tag for a second-type RFID reader; and forming, by the second-type RFID reader, a second-type RFID signal according to the data of the second-type RFID tag and sending the second-type RFID signal.

The data application method can be achieved through a data application system including a first-type RFID reader, an RFID emulator and a second-type RFID reader, by use of the data application system, it is feasible to achieve conversion between different types of RFID tags, so as to help to achieve an RFID supporting function of the terminals, for example, the smart mobile terminals are merely equipped with an NFC function that is relatively easy to install and little affects portability of the smart mobile terminals, and through cooperation of the data application system of the embodiment of the present application, it is still feasible to achieve a reading function for various types of RFID tags.

In terms of various components in the data application system, i.e., the first-type RFID reader, the second-type RFID reader and the RFID emulator, they may be separated physically, and the various components may achieve connections via a wired or wireless network. On the other hand, the components may also be integrated into the same physical device (referred to as RFID data application device). The RFID data application device may acquire associated data of the data of the first-type RFID tag from a cloud server or a local database according to the data of the first-type RFID tag.

Databases are generally achieved by mass storage devices. The locations of the mass storage devices relative to the RFID data application device may be the cloud, that is, are not the same as the physical position of the RFID data application device, and the RFID data application device may be accessed to the databases through the Internet, that is, the databases are cloud databases. The databases may also be local databases, that is, the RFID data application device and the mass storage devices are in the same physical position, and can be connected through, for example, wired cables.

In the cloud, it is feasible to configure a cloud server for supporting the data application system. The cloud server includes a central processing device for executing specific instructions and a mass data storage device, for example, a blade storage array. The mass data storage device in the cloud is the cloud database. The central processing device is used for executing specific instructions, so as to execute various system related operations. The RFID data application device may exchange data with the cloud server, for example, obtain associated data of the data of the first-type RFID tag. The associated data, for example, may be product related information of products to which the first-type RFID tag is attached. The cloud server supports a wireless or wired access manner; the wireless or wired access manner includes: a WIFI/2G/3G/4G mobile network access manner, or a satellite communications or wireless radio communications access manner.

In one embodiment of the present application, the first-type RFID tag is a UHF tag, the first-type reader is a UHF reader, the second-type RFID tag is an NFC tag, the second-type reader is an NFC reader, and the second-type RFID signal is an NFC signal. It is feasible to acquire the NFC signal from the NFC reader through a smart mobile terminal with an NFC function.

In the above embodiment, supply chain/logistics' and consumers' respective demands are met simultaneously by using UHF electronic tags and mobile devices (e.g., smartphones) with an NFC function, so as to further extend and widen applications of the UHF electronic tags.

Figure 2:
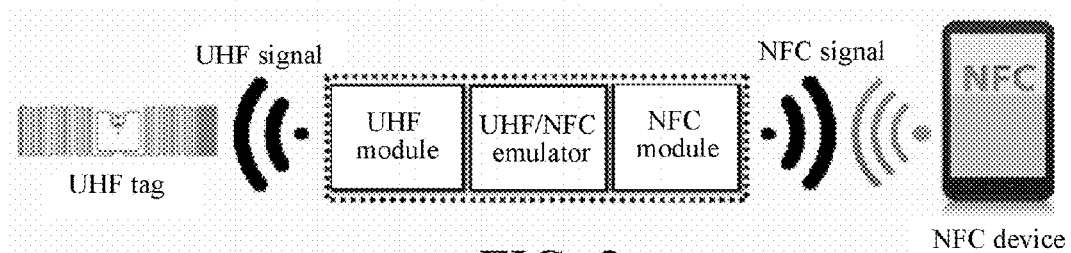
FIG. 2 and FIG. 3 are system architecture diagrams of conversion from UHF to NFC according to an embodiment of the present application.
Figure 3:
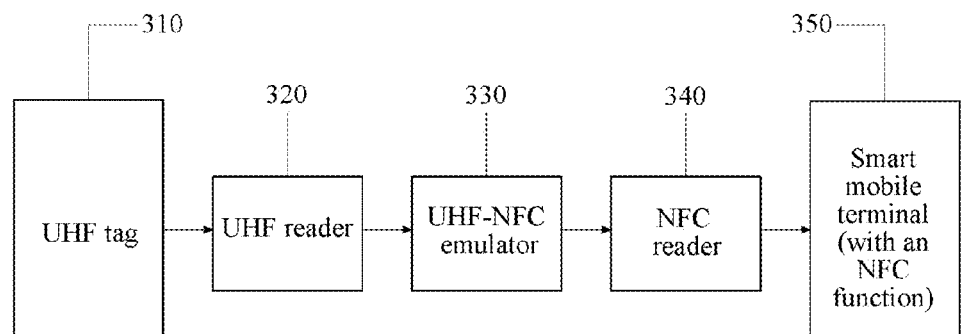
Figure 4:
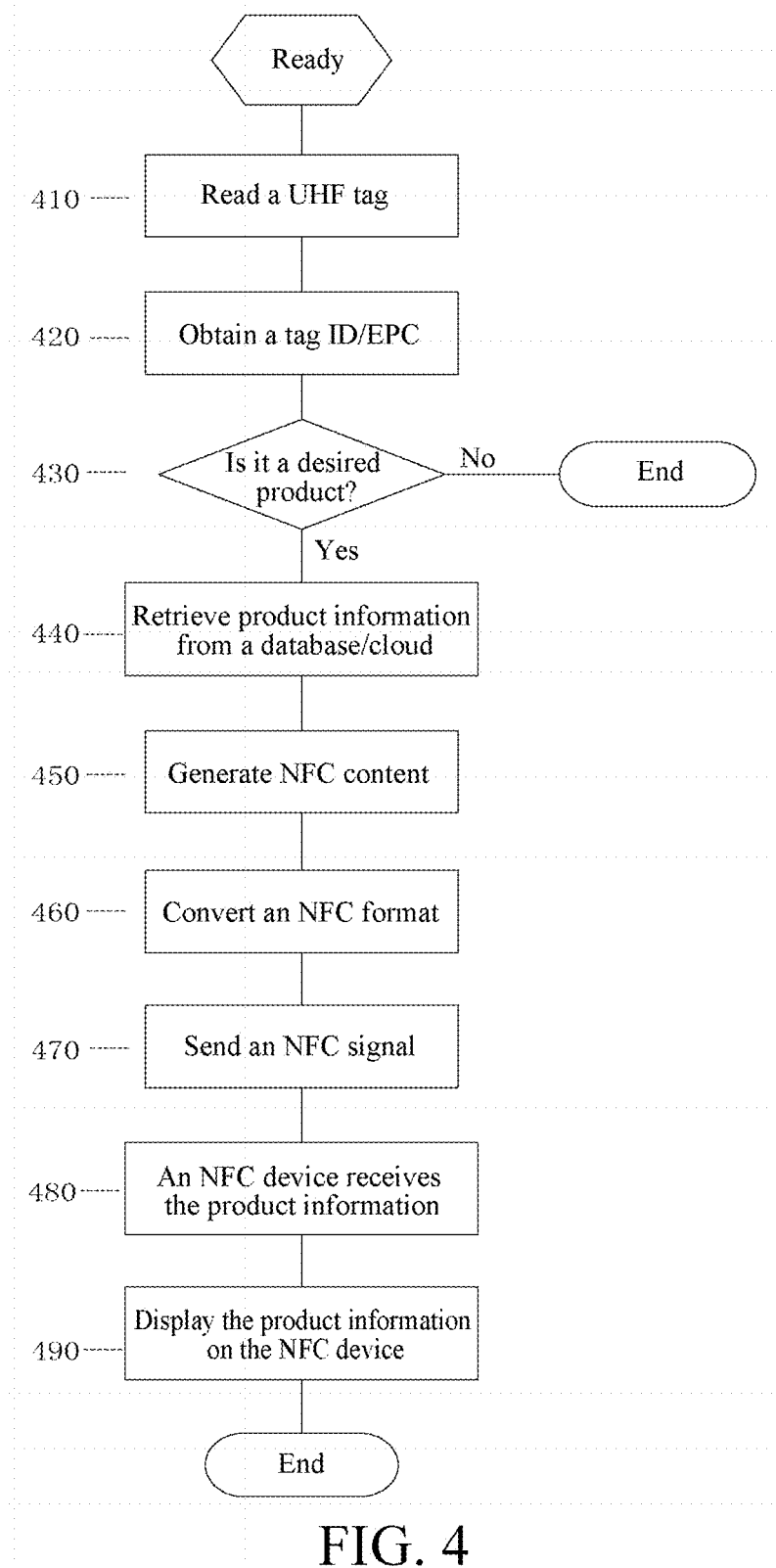
FIG. 4 is a flow chart from a UHF tag to an NFC smart terminal according to an embodiment of the present application.

Referring to FIG. 2 and FIG. 3, a UHF reader 320, an RFID (UHF-NFC) emulator 330 and an NFC reading module 340 are organically combined, to achieve acquisition, conversion and expansion of a UHF signal and transmission of an NFC signal, to enable an NFC smart terminal 350 to conveniently receive related information, thereby achieving data communication from a UHF electronic tag 310 to the NFC smart terminal 350. The RFID emulator 330 uses a predetermined data conversion protocol to perform conversion from UHF tag data to NFC tag data, which may include a standard or custom coding algorithm. The RFID emulator may integrate a codec system, used for achieving data conversion, and the codec system may be achieved by using hardware, for example, a dedicated IC, DSP (digital signal processing) processor, and may also be achieved by using, for example, software programs implemented in various programming languages such as C and assembly languages. Specifically, refer to FIG. 4 for an operating flow of the data application method, including:

410: transmitting, by the UHF reader, radio waves through a UHF antenna, and when the UHF tag is within coverage of the radio waves, the UHF tag being activated;

420: returning, by the UHF tag, a Tag ID or an Electronic Product Code (EPC), and receiving, by the UHF reader, related information through the UHF antenna;

430: transmitting, by the UHF reader, the Tag ID/EPC to the codec system in the RFID emulator and judging whether the UHF tag is a desired product, for example, a desired company product;

440: calling out, by the codec system, product information represented by the UHF tag from a database/cloud;

450 and 460: generating, by the emulator, NFC content through a standard or custom coding algorithm, which automatically converts to NFC codes and related information;

470: sending, by the emulator, the generated NFC signal through the NFC reader;

480: obtaining, by the smart mobile terminal of which the NFC function has been opened, the NFC signal within the readable range; and 490: acquiring and displaying related information (text, image, webpage and so on) of the product through an application (App) or a hyperlink.

Figure 5:
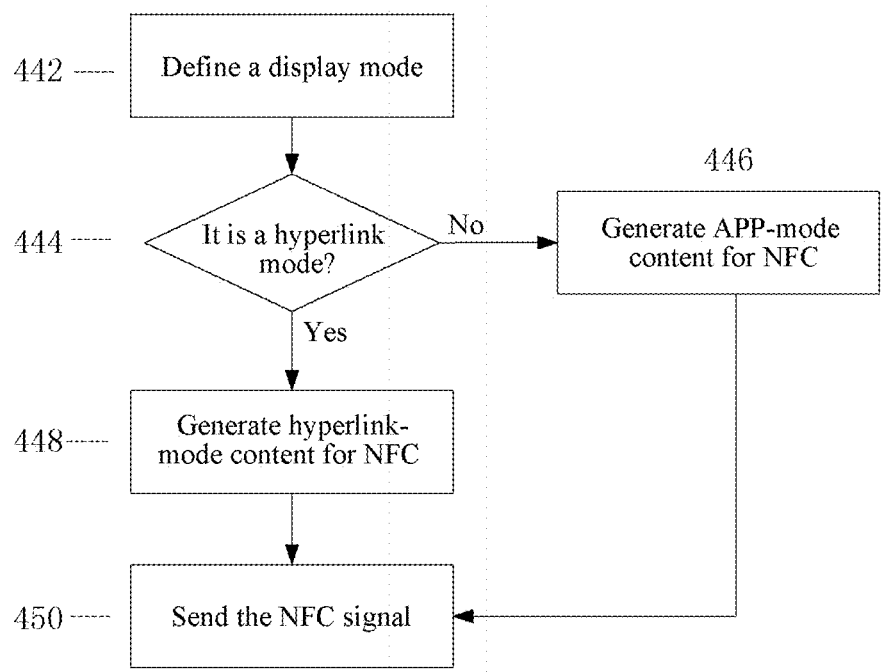
FIG. 5 illustrates a data extension manner according to an embodiment of the present application.

FIG. 5 illustrates two data extension manners according to an embodiment of the present application, i.e., APP mode or hyperlink mode, including:

442 and 444: the system judges and decides in which manner the product information is displayed, if it is the hyperlink mode, proceed to step 448, and otherwise, proceed to step 446, 446: when the product information is displayed in the APP manner, the acquired data is generated in the APP mode, 448: when the product information is displayed in the hyperlink manner, the acquired data is generated in the hyperlink mode, and the NFC signal is then sent in step 450.

Figure 6:
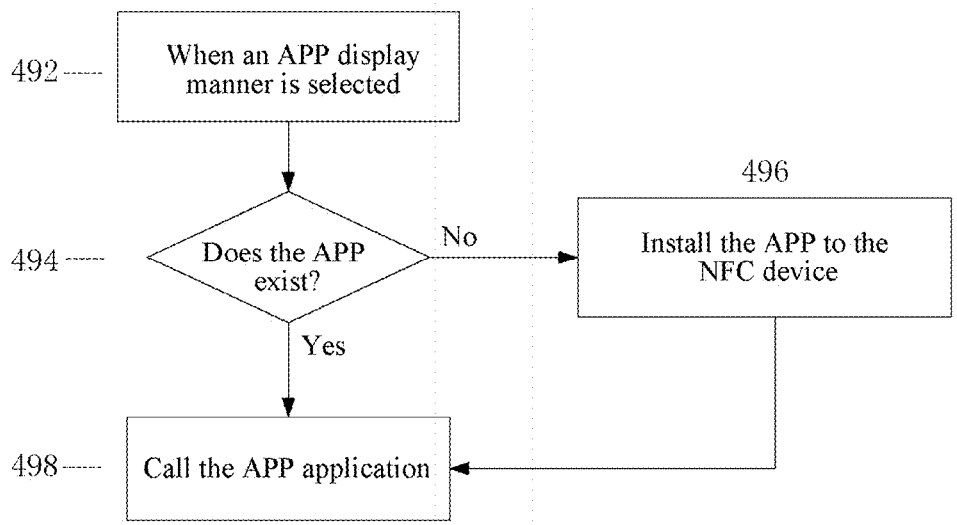
FIG. 6 illustrates a flow of judging and installing APP according to an embodiment of the present application.

FIG. 6 illustrates a flow of judging and installing APP according to an embodiment of the present application:

492: when the system decides to display the information in the APP manner,

494: the system judges whether the APP exists,

496: if the APP has not yet been installed, an APP program is installed first, and 498: if the APP has been installed, the APP is started and the product information is displayed.

The data application method and system according to the embodiments of the present application are particularly useful in the retail industry, especially in clothing, shoes and handbags: for example, after related apparatuses are installed and configured in an experience shop with the method, consumers can conveniently use their own smart mobile devices to acquire information of items represented by UHF tags; at the same time, merchants can establish close relationships with the consumers, promote products, and enhance the consumers' loyalty to the brand accordingly.

Figure 7:
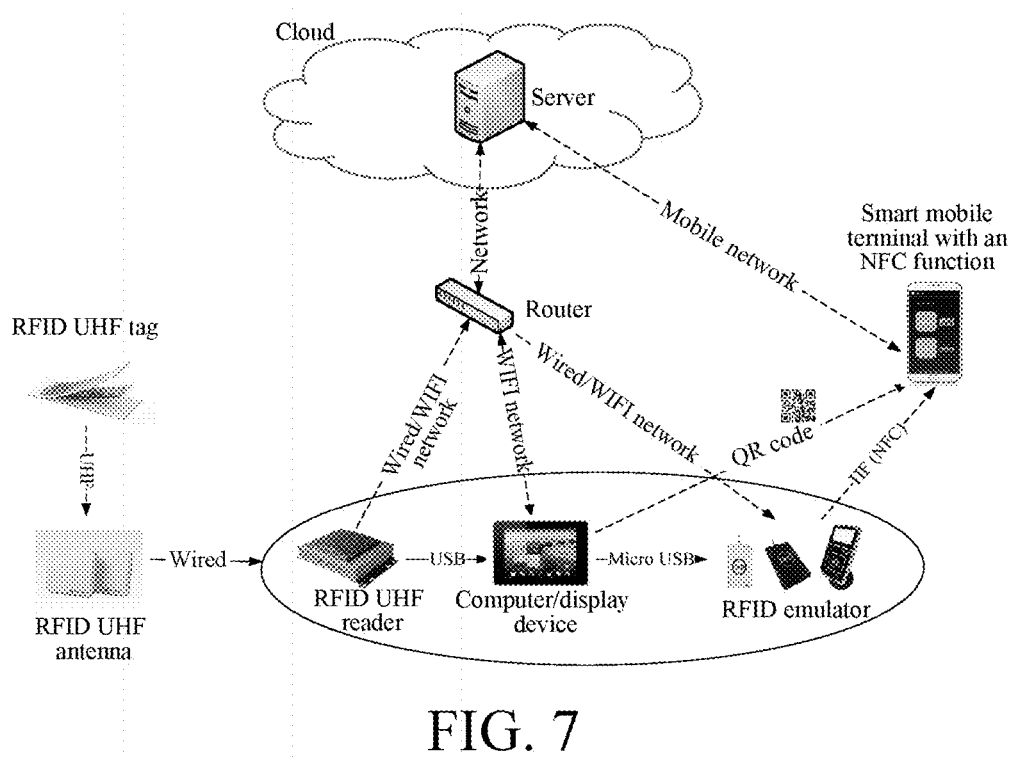
FIG. 7 is a system architecture diagram of UHF-to-NFC configured at a retail store by using a data application method according to an embodiment of the present application.

FIG. 7 is a system architecture diagram of UHF-to-NFC configured at a retail store by using a data application method according to an embodiment of the present application: when a UHF electronic tag is within a readable range of a UHF antenna (in a wired connection with a UHF reader) of the UHF reader, the data application system will automatically acquire a UHF code (EPC), is connected to the cloud database through a wireless network and the Internet to acquire further information and cooperate with the RFID emulator to transmit an NFC signal, as long as the smart mobile terminal with an NFC function gets close to the NFC reader, corresponding information can be acquired, achieving the function of "reading" the UHF tag by the NFC mobile terminal. It can be seen that the system architecture may be fairly flexible, for example, the cloud server may be connected to a router via a network, and the router respectively connects the UHF reader via a wired or WIFI network, connects a computer or display device via a WIFI network and connects the RFID emulator via a wired or WIFI network. The UHF reader, the computer or display device and the RFID emulator may be connected with each other through a USB or Micro USB, the smart mobile terminal with an NFC function may read Quick Response (QR) codes with the computer or display device, and the smart mobile terminal may also interact with the cloud server via a mobile network. It can be understood that the smart mobile terminal may be a smartphone with an NFC function, may also be a smart wearable device or tablet computer and so on. By use of the system, the consumers can use their own smartphones and other devices to understand item information and identify authenticity of purchased items, and provide convenient way of contact for merchants' after-sales services.

The UHF reader is generally big and complicated, also expensive, and difficult to be embedded into a mobile terminal (especially smartphone), and there are following possible methods that can meet supply chain/logistics' and consumers' demands while achieving one electronic tag:

one chip that combines UHF and NFC is developed, which does not exist at present, and even if it exist, the price of the chip is at least 5 times that of the UHF;

UHF and NFC are composited on the same tag, but the electronic tag made in this way has a large area, and the cost thereof is at least 3 times that of the UHF tag; and a UHF reader is plugged/embedded on a mobile device, but the UHF reader is not only expensive but also affects portability of the mobile device. It is inappropriate for users in terms of both the cost and the use experience.

The data application method and system according to the embodiments of the present application can use a smart mobile device with NFC to achieve reading of the UHF tag, so that a UHF electronic tag not only can play a role in supply chain/logistics, but also can let consumers use mobile terminals (e.g., smartphones) to acquire related information, to cause applications of RFID to be more extensive, and can better balance the price, convenience, popularity and other elements. In addition, although the above embodiments take that the UHF tag is read by a smart mobile device with an NFC function as an example, it can be understood that it can also similarly achieve that the UHF tag is read by a smart mobile device with a QR code scanning function, that is, the first-type tag is a UHF tag and the second-type reader is a QR code reader; as stated previously, to be suitable for portability applications of the smart mobile device, the second-type reader is generally of a type that is relatively easy to be integrated into the smart mobile device, for example, NFC reading, QR code scanning and so on, which has a low relative cost and hardly affects portability of the smart mobile device. The first-type tag may be set according to needs.

Although the present application has been described in detail together with specific embodiments, it should be realized that some other transformations of the present application may be designed without departing from the purpose of the present application.

What is claimed is:

1. A data application method of radio-frequency identification (RFID) tags, comprising:
   when a first-type RFID tag is within a readable range of a first-type RFID reader, acquiring, by the first-type RFID reader, data of the first-type RFID tag;
   obtaining, by an RFID emulator, the data of the first-type RFID tag, converting the data of the first-type RFID tag to data of a second-type RFID tag according to a predetermined data conversion protocol, and providing the data of the second-type RFID tag for a second-type RFID reader; and
   forming, by the second-type RFID reader, a second-type RFID signal according to the data of the second-type RFID tag and sending the second-type RFID signal;
   wherein the first-type RFID tag is an Ultra High Frequency (UHF) tag, the first-type reader is a UHF reader, the second-type RFID tag is a Near Field Communication (NFC) tag, the second-type reader is an NFC reader, and the second-type RFID signal is an NFC signal; the NFC signal is acquired from the NFC reader through a smart mobile terminal with an NFC function;
   wherein an operating process of the data application method comprises:
   transmitting, by the UHF reader, radio waves through a UHF antenna, and when the UHF tag is within coverage of the radio waves, the UHF tag being activated;
   obtaining, by the UHF reader, tag identification or an electronic product code sent by the activated UHF tag through the UHF antenna;
   transmitting, by the UHF reader, the tag identification or electronic product code to the RFID emulator and judging whether the UHF tag is a desired product;
   acquiring, by the RFID emulator, product information represented by the UHF tag from a local database or a cloud server;
   converting, by the RFID emulator, the product information to an NFC code containing product related information according to a predetermined coding algorithm;
   sending, by the RFID emulator, an NFC signal containing the NFC code through the NFC reader; and
   obtaining, by the smart mobile terminal of which the NFC function has been opened, the NFC signal within the readable range, and acquiring and displaying the product related information through an application mode or a hyperlink mode.

2. The data application method according to claim 1, wherein the first-type RFID reader, the second-type RFID reader and the RFID emulator are integrated into a physical device.

3. The data application method according to claim 2, wherein the physical device acquires associated data of the data of the first-type RFID tag from a cloud server according to the data of the first-type RFID tag.

4. The data application method according to claim 2, wherein the physical device acquires associated data of the data of the first-type RFID tag from a local database according to the data of the first-type RFID tag.

5. The data application method according to claim 1, wherein the RFID emulator integrates a codec system that achieves data conversion.

6. The data application method according to claim 5, wherein the codec system comprises a dedicated IC, or a digital signal processing (DSP) processor.

7. The data application method according to claim 1, wherein the first-type RFID tag is an Ultra High Frequency (UHF) tag, the first-type reader is a UHF reader, the second-type RFID tag is a quick response (QR) tag, the second-type reader is a QR reader, and the second-type RFID signal is a QR signal.

8. The data application method according to claim 1, comprising:
   judging and deciding in which manner the product information is displayed, wherein when the product information is displayed in an APP manner, acquired data is generated in the application mode, and when the product information is displayed in a hyperlink manner, the acquired data is generated in the hyperlink mode.

9. A data application system of radio-frequency identification (RFID) tags, comprising:
   a first-type RFID reader that, when a first-type RFID tag is within a readable range of the first-type RFID reader, acquires data of the first-type RFID tag;
   an RFID emulator that obtains the data of the first-type RFID tag, converts the data of the first-type RFID tag to data of a second-type RFID tag according to a predetermined data conversion protocol, and provides the data of the second-type RFID tag for a second-type RFID reader; and
   the second-type RFID reader that forms a second-type RFID signal according to the data of the second-type RFID tag and sends the second-type RFID signal;
   wherein the first-type RFID tag is an Ultra High Frequency (UHF) tag, the first-type reader is a UHF reader, the second-type RFID tag is a Near Field Communication (NFC) tag, the second-type reader is an NFC reader, and the second-type RFID signal is an NFC signal; the NFC signal is acquired from the NFC reader through a smart mobile terminal with an NFC function;
   wherein the UHF reader transmits radio waves through a UHF antenna, and when the UHF tag is within coverage of the radio waves, the UHF tag is activated;
   the UHF reader obtains tag identification or an electronic product code sent by the activated UHF tag through the UHF antenna;
   the UHF reader transmits the tag identification or electronic product code to the RFID emulator and judges whether the UHF tag is a desired product;

the RFID emulator acquires product information represented by the UHF tag from a local database or a cloud server;

the RFID emulator converts the product information to an NFC code containing product related information according to a predetermined coding algorithm;

the RFID emulator sends an NFC signal containing the NFC code through the NFC reader; and the smart mobile terminal of which the NFC function has been opened obtains the NFC signal within the readable range, acquires and displays the product related information through an application mode or a hyperlink mode.

10. The data application system according to claim 9, wherein the first-type RFID reader, the second-type RFID reader and the RFID emulator are integrated into a physical device.

11. The data application system according to claim 10, wherein the physical device acquires associated data of the data of the first-type RFID tag from a cloud server according to the data of the first-type RFID tag.

12. The data application system according to claim 10, wherein the physical device acquires associated data of the data of the first-type RFID tag from a local database according to the data of the first-type RFID tag.

13. The data application system according to claim 9, wherein the RFID emulator integrates a codec system that achieves data conversion.

14. The data application system according to claim 13, wherein the codec system comprises a dedicated IC, or a digital signal processing (DSP) processor.

* * * * *